US009868065B2

(12) United States Patent
Ishida et al.

(10) Patent No.: US 9,868,065 B2
(45) Date of Patent: Jan. 16, 2018

(54) INFORMATION PROCESSING DEVICE

(71) Applicant: Sony Computer Entertainment Inc., Tokyo (JP)

(72) Inventors: Takayuki Ishida, Tokyo (JP); Osamu Ota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 76 days.

(21) Appl. No.: 14/655,989

(22) PCT Filed: Jan. 21, 2014

(86) PCT No.: PCT/JP2014/051146
§ 371 (c)(1),
(2) Date: Jun. 26, 2015

(87) PCT Pub. No.: WO2014/112647
PCT Pub. Date: Jul. 24, 2014

(65) Prior Publication Data
US 2015/0352447 A1 Dec. 10, 2015

(30) Foreign Application Priority Data
Jan. 21, 2013 (JP) .................................. 2013-008769

(51) Int. Cl.
*A63F 9/24* (2006.01)
*A63F 13/00* (2014.01)
(Continued)

(52) U.S. Cl.
CPC ............ *A63F 13/798* (2014.09); *A63F 13/35* (2014.09); *A63F 13/792* (2014.09);
(Continued)

(58) Field of Classification Search
USPC ................ 463/20, 22, 25, 29, 30, 39, 42, 43
See application file for complete search history.

(56) References Cited

U.S. PATENT DOCUMENTS

| 2001/0019965 A1 | 9/2001 | Ochi |
| 2005/0143166 A1* | 6/2005 | Walker ................ G07F 17/3244 463/25 |

(Continued)

FOREIGN PATENT DOCUMENTS

| CN | 1300021 A | 6/2001 |
| CN | 1894694 A | 1/2007 |

(Continued)

OTHER PUBLICATIONS

International Search Report for corresponding PCT Application No. PCT/JP2014/051146, dated Apr. 1, 2014.

(Continued)

*Primary Examiner* — Adetokunbo O Torimiro
(74) *Attorney, Agent, or Firm* — Matthew B. Dernier, Esq.

(57) ABSTRACT

A game system that can offer motivation promoting participation to players is provided. An information processing device accepts an investment instruction to specify any of plural game players as an investment-target player from an investor player and records a play result of a game by the investment-target player. Furthermore, the information processing device decides investment performance of the investor player according to the play result of the game recorded about the investment-target player specified by the investor player.

9 Claims, 7 Drawing Sheets

(51) Int. Cl.
  *G06F 17/00*    (2006.01)
  *G06F 19/00*    (2011.01)
  *A63F 13/798*   (2014.01)
  *A63F 13/847*   (2014.01)
  *A63F 13/35*    (2014.01)
  *A63F 13/792*   (2014.01)
  *G09B 5/02*     (2006.01)
  *G06Q 30/02*    (2012.01)
  *G09B 19/18*    (2006.01)

(52) U.S. Cl.
  CPC ....... *A63F 13/847* (2014.09); *G06Q 30/0209* (2013.01); *G09B 5/02* (2013.01); *G09B 19/18* (2013.01)

(56) References Cited

U.S. PATENT DOCUMENTS

| | | | |
|---|---|---|---|
| 2007/0054739 A1 | 3/2007 | Amaitis | |
| 2009/0143141 A1* | 6/2009 | Wells | G07F 17/32 463/37 |
| 2009/0197684 A1 | 8/2009 | Arezina | |
| 2011/0190066 A1* | 8/2011 | Barclay | G07F 17/3227 463/42 |
| 2014/0073416 A1* | 3/2014 | Toyama | G07F 17/3251 463/25 |
| 2014/0179442 A1* | 6/2014 | Quinlivan | A63F 13/00 463/43 |

FOREIGN PATENT DOCUMENTS

| | | |
|---|---|---|
| EP | 1919581 A2 | 5/2008 |
| JP | 2004065339 A | 3/2004 |
| JP | 2005287521 A | 10/2005 |
| JP | 2009500122 A | 1/2009 |
| JP | 2009539421 A | 11/2009 |
| JP | 2010-088694 A | 4/2010 |
| WO | 2007008597 A2 | 1/2007 |
| WO | 2007008601 A2 | 1/2007 |
| WO | 2007142980 A2 | 12/2007 |

OTHER PUBLICATIONS

'Wonder Life Special [Nintendo Official Guide Book] Super Mario Stadium Miracle Baseball', first edition, first print, Shogakukan Inc., 4 pages, (Sep. 20, 2005). (For Relevancy see International Search Report for corresponding PCT Application No. PCT/JP2014/051146, dated Apr. 1, 2014 cited above).

"Sega Sports Virtua Athlete 2K", 'Yasui! Kantan! Omoshiroi! Net de Game wa Tanoshiku naru! Katsuyohen Dreamcast Internet Guide', first edition, Softbank Publishing Inc., 4 Pages, (Aug. 28, 2000), p. 018(For Relevancy see International Search Report for corresponding PCT Application No. PCT/JP2014/051146, dated Apr. 1, 2014 cited above).

International Preliminary Report on Patentability and Written Opinion for corresponding PCT Application No. PCT/JP2014/051146, dated Jul. 30, 2015.

Office Action for corresponding CN Application No. 201480004767, 11 pages, dated Apr. 6, 2017.

* cited by examiner

| PLAYER ID | THE NUMBER OF TICKETS |
|---|---|
| 100 | 20 |
| 101 | 8 |
| 200 | 15 |
| 201 | 32 |
| ⋮ | ⋮ |

FIG. 4

| INVESTMENT ID | PLAYER ID OF INVESTOR PLAYER | PLAYER ID OF INVESTMENT-TARGET PLAYER | THE NUMBER OF TICKETS | INVESTMENT OBJECT PERIOD | INITIAL INVESTMENT TIMING |
|---|---|---|---|---|---|
| 1 | 100 | 200 | 10 | JUL/2/2012 THRU JUL/8/2012 | JUN/20/2012 |
| 2 | 101 | 201 | 20 | JUL/2/2012 THRU JUL/8/2012 | JUL/1/2012 |
| ... | ... | ... | ... | ... | ... |

FIG.5

| GAME ID | GAME TITLE | GENRE |
|---------|------------|-------|
| 50 | CAR RACE X | RACE GAME |
| 51 | PUZZLE Y | PUZZLE GAME |
| ⋮ | ⋮ | ⋮ |

FIG. 6

| GAME PLAY ID | PLAYER ID | GAME ID | PLAY START DATE AND TIME | PLAY END DATE AND TIME | WON POINTS | PLAY MOVING IMAGE |
|---|---|---|---|---|---|---|
| 1 | 200 | 50 | JUL/1/2012 10:00:00 | JUL/1/2012 10:05:30 | 100 | Gp1.movie |
| 2 | 201 | 51 | JUL/1/2012 10:20:00 | JUL/1/2012 10:23:10 | 50 | Gp2.movie |
| ... | ... | ... | ... | ... | ... | ... |

FIG. 7

| PLAYER ID | KIND OF MEDAL | INVESTMENT PERFORMANCE DECISION TIMING |
|---|---|---|
| 100 | GOLD | JUL/8/2012 |
| 101 | SILVER | JUL/15/2012 |
| ⋮ | ⋮ | ⋮ |

FIG. 8

PLAY PERFORMANCE RANKING

TALLYING OBJECT PERIOD: JUL/2/2012 THRU JUL/8/2012

| RANK | PLAYER NAME | WON POINTS |
|---|---|---|
| 1 | A | 3000 |
| 2 | B | 2800 |
| ⋮ | ⋮ | ⋮ |

FIG. 9

INVESTMENT PERFORMANCE

TALLYING OBJECT PERIOD: JUL/2/2012 THRU JUL/8/2012          GENRE: ALL

| RANK | GAME PLAYER | | INVESTOR PLAYER | |
|---|---|---|---|---|
| | PLAYER NAME | REWARD | PLAYER NAME | REWARD |
| 1 | A | 200 TICKETS | C | GOLD MEDAL |
| 2 | B | 100 TICKETS | D | SILVER MEDAL |
| ⋮ | ⋮ | ⋮ | ⋮ | ⋮ |

INFORMATION PROCESSING DEVICE

TECHNICAL FIELD

The present invention relates to an information processing device that configures a game system in which plural participant players participate, a control method thereof, a control program thereof, and an information storage medium that stores the program.

BACKGROUND ART

A game platform in which plural players can participate and enjoy various kinds of games is known (refer to e.g. PLT 1).

CITATION LIST

Patent Literature

[PLT 1] Japanese Patent Laid-open No. 2010-088694

SUMMARY

Technical Problem

In the above-described game platform, it is desired that many players frequently participate over the long term and continue to play games. For this purpose, it is preferable that the game platform not merely enables game plays but can offer a wide variety of ways of enjoyment to a wide variety of players.

The present invention is made in view of the above-described circumstances and one of objects thereof is to provide an information processing device that can offer motivation promoting participation to players, a control method thereof, a control program thereof, and an information storage medium that stores the program.

Solution to Problem

An information processing device according to the present invention includes an investment instruction accepter that accepts an investment instruction to specify any of a plurality of game players as an investment-target player from an investor player, a play result recorder that records a play result of a game by the investment-target player, and an investment performance decider that decides investment performance of the investor player according to the play result of the game recorded about the investment-target player specified by the investor player.

A control method of an information processing device according to the present invention includes a step of accepting an investment instruction to specify any of a plurality of game players as an investment-target player from an investor player, a step of recording a play result of a game by the investment-target player, and a step of deciding investment performance of the investor player according to the play result of the game recorded about the investment-target player specified by the investor player.

A program according to the present invention is a program for causing a computer to function as an investment instruction accepter that accepts an investment instruction to specify any of a plurality of game players as an investment-target player from an investor player, a play result recorder that records a play result of a game by the investment-target player, and an investment performance decider that decides investment performance of the investor player according to the play result of the game recorded about the investment-target player specified by the investor player. This program may be stored in a computer-readable information storage medium.

BRIEF DESCRIPTION OF DRAWINGS

FIG. 4 is a diagram showing one example of an investment table.

FIG. 5 is a diagram showing one example of a game table.

FIG. 6 is a diagram showing one example of a play result table.

FIG. 7 is a diagram showing one example of an investment performance table.

FIG. 8 is a diagram showing one example of a screen that displays ranking information of game play performance.

FIG. 9 is a diagram showing one example of a screen that displays investment performance.

DESCRIPTION OF EMBODIMENTS

An embodiment of the present invention will be described in detail below on the basis of the drawings.

Figure 1:
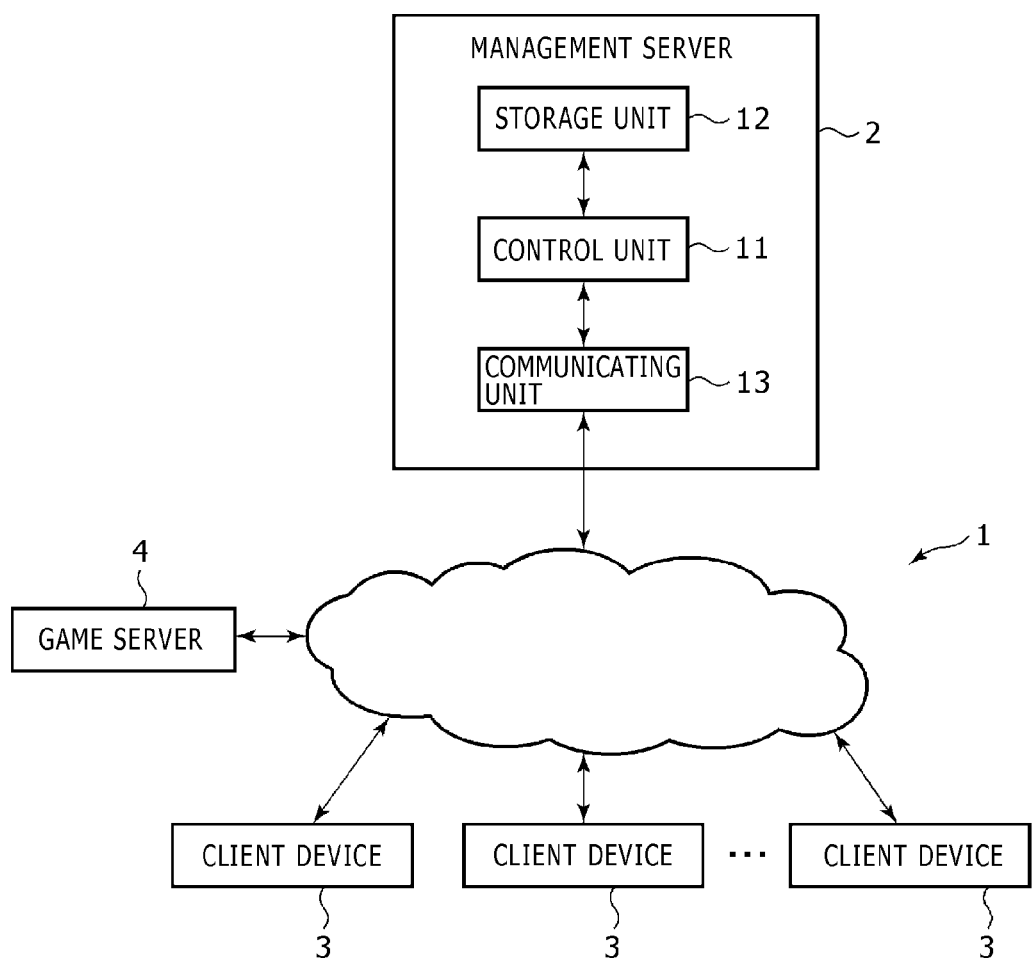
FIG. 1 is an overall configuration diagram of a game system according to an embodiment of the present invention.

FIG. 1 is a configuration diagram of a game system 1 according to one embodiment of the present invention. As shown in FIG. 1, the game system 1 is configured to include a management server (information processing device) 2, plural client devices 3, and a game server 4. The client devices 3 are terminal devices used by participant players P who participate in a game platform implemented in the game system 1, and may be e.g. game consoles for home use, portable game machines, smartphones, personal computers, etc. Each client device 3 has an operation device used by the participant player P for operation input and a display screen that displays various kinds of information.

As shown in FIG. 1, the management server 2 is configured to include a control unit 11, a storage unit 12, and a communicating unit 13.

The control unit 11 is a CPU or the like and executes various kinds of information processing in accordance with a program stored in the storage unit 12. The storage unit 12 is configured to include a memory element such as a RAM and stores the program to be executed by the control unit 11 and data as a processing target of the program. In the data stored by the storage unit 12, the content of various kinds of tables to be described later are included.

The communicating unit 13 is a communication interface such as a LAN card and the management server 2 performs transmission and reception of data with each of the plural client devices 3 and the game server 4 via the communicating unit 13.

The game system 1 according to the present embodiment provides the participant players P with a game play function and a function of investment in game players. The game play function is a function to execute an online game and this function allows the participant players P to play and enjoy a game offered by the game system 1. The game offered by the game system 1 may be plural kinds of games. Hereinafter, the participant player P who plays a game will be referred to as a game player GP. Moreover, in the present embodiment, by the investment function provided by the game system 1, the participant player P can not only enjoy a game play as the game player GP but also invest in the game player GP. Hereinafter, the participant player P who invests in the game player GP will be referred to as an investor player IP. Hereinafter, it is assumed that the game player GP and the investor player IP are different persons for convenience of description. However, the participant player P can take stands of both the game player GP and the investor player IP.

The game server 4 is an information processing device that provides a function of play of an online game and executes processing of a game played by the game player GP. The client device 3 communicates with the game server 4 and thereby the game player GP plays the game executed by the game server 4 through the client device 3. Here, for convenience of description, it is assumed that the game server 4 executes all of the processing of plural kinds of games implemented in the present embodiment. However, the embodiment of the present invention is not limited to such a configuration but plural game servers 4 may each independently process different kinds of games from those of the other game servers 4. This allows plural game vendors to each independently provide the game server 4 and let the game players GP play a game offered by the game vendor.

Figures 2, 3:
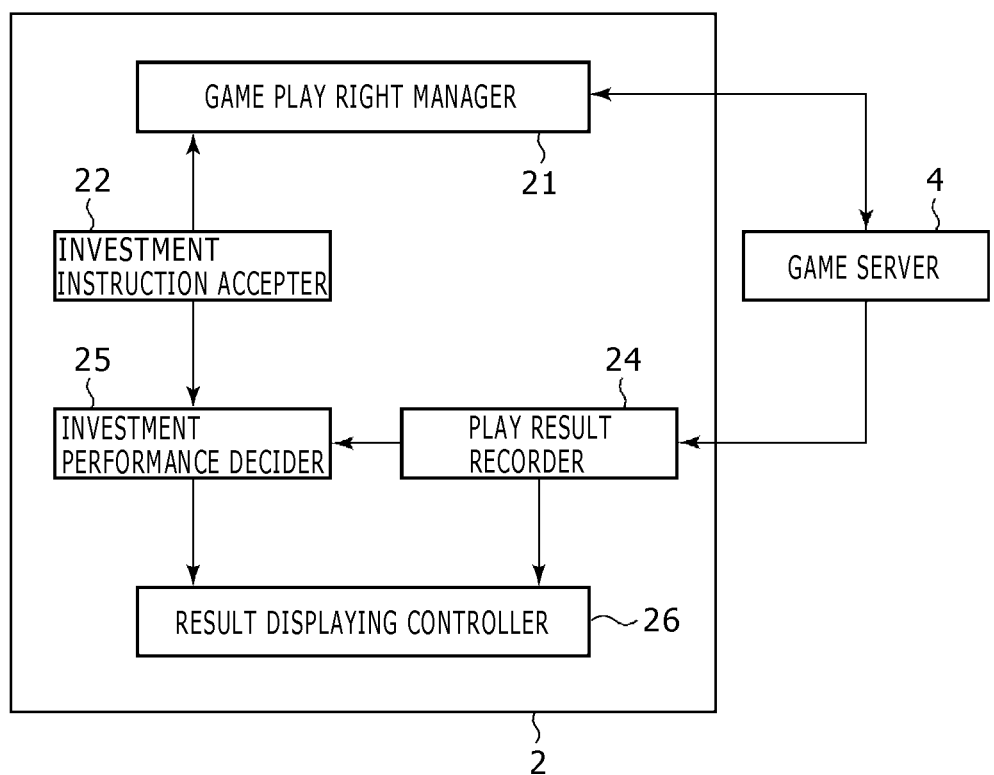
FIG. 2 is a functional block diagram of an information processing device according to the embodiment of the present invention.
FIG. 3 is a diagram showing one example of a game play right table.

Functions implemented by the management server 2 will be described below by using a functional block diagram of FIG. 2. As shown in FIG. 2, the management server 2 is functionally configured to include a game play right manager 21, an investment instruction accepter 22, a play result recorder 24, an investment performance decider 25, and a result displaying controller 26. These functions are implemented through execution of the program stored in the storage unit 12 by the control unit 11. This program may be stored in various kinds of information storage media such as an optical disc to be provided to the management server 2 or may be provided to the management server 2 via a communication network such as the Internet.

The game play right manager 21 manages information on a game play right R given to each participant player P. The game play right R is a necessary right for the game player GP to play a game offered by the present game system 1. The game play right R is managed in a unit of the play time or the number of times of a play, for example. Hereinafter, suppose that the game play right R is managed as a ticket conceptually and the game player GP can play games according to the number of tickets possessed by this game player GP. For example, the game player GP can play a game for a certain time (or a certain number of times) every time consuming one ticket. The play time or the number of times of a play of a game permitted per consumption of one ticket may be decided for each kind of game.

Specifically, when accepting a request for a game play from the game player GP, the game server 4 makes an inquiry to the management server 2 about whether or not to permit the play. In this inquiry, information to identify the game player GP who requests the game play is included. The game play right manager 21 that has received this inquiry checks whether the requesting game player GP possesses a ticket and returns a response indicating that the game play is not permitted if the game player GP does not possess a ticket. On the other hand, if the requesting game player GP possesses a ticket, the game play right manager 21 returns a response indicating that the game play in a certain range is permitted and executes processing of reducing the number of tickets possessed by this game player GP. This allows each game player GP to play games in an available range depending on the tickets possessed by the game player GP. Suppose that, in the present embodiment, the game play right R is necessary in common to play all of plural kinds of games offered by the game server 4.

The game play right manager 21 gives the game play right R to each participant player P in accordance with predetermined conditions. For example, the game play right manager 21 may give a certain number of tickets to each participant player P every certain period and may give a certain number of tickets to the participant player P who logs in the game system 1 in a predetermined period. Furthermore, tickets the number of which corresponds to the amount of charge may be given to the participant player P who is charged. The game play right R may be managed as tickets of kinds different for each acquisition method. For example, the game play right manager 21 may regard a ticket provided for free and a ticket provided according to charging as different kinds of tickets and manage the numbers of these tickets.

FIG. 3 shows one example of a game play right table that stores information on the game play right R managed by the game play right manager 21. In this game play right table, regarding all of the participant players P, information to identify the participant player P (player ID) and the number of tickets possessed by this participant player P are stored in association with each other.

The investment instruction accepter 22 accepts an investment instruction from the investor player IP. The investment instruction includes information that specifies any of the plural participant players P as an investment-target player. In the present embodiment, the object of the investment in the investment-target player is the game play right R (ticket). The investment instruction may include information on the amount of investment (here, the number of tickets) indicating how much the investment is made into the investment-target player. When accepting an instruction to invest in the game player GP from the investor player IP, the investment instruction accepter 22 transfers as many tickets as specified by the amount of investment among the tickets possessed by the investor player IP to the game player GP as the investment target. This allows the investor player IP to offer tickets not to be used to the game player GP other than this investor player IP instead of playing a game for oneself by using the tickets possessed by this investor player IP. Meanwhile, the game player GP receives the investment from the investor player IP to increase the number of tickets possessed by this game player GP and thereby can play games more. Regarding the amount of investment (the number of tickets) specified in the investment instruction, the minimum number and investment unit thereof may be set. Furthermore, in the case of managing the tickets as tickets of kinds different for each acquisition method, the kind of ticket that can be used for investment may be limited.

FIG. 4 shows one example of an investment table that stores the content of investment instructions accepted by the investment instruction accepter 22. When accepting an investment instruction, the investment instruction accepter 22 assigns an investment ID to identify the investment on the basis on this investment instruction and adds, to the investment table, a record in which the player ID of the investor player IP, the player ID of the investment-target player, the amount of investment (the number of tickets), an investment object period, and an initial investment timing are associated with this investment ID. The investment object period is automatically decided according to the timing when the investment instruction is accepted. Furthermore, the initial investment timing indicates the timing when the first investment is made in the investment-target player when the investor player IP consecutively continues the investment in the same investment-target player. This information is used for calculation of investment period information to be described later.

Every time the game player GP plays a game, the play result recorder 24 records the play result (play performance) of the game. Here, suppose that the play performance of the game executed by the game server 4 is represented by points (numerical value) irrespective of the kind of game. The higher the points are, the better the play performance of the game is. How much points are given to what kind of play is individually decided for each kind of game. For example, in the case of a match-up game in which a match with another game player GP is played, points may be given through a win over the opposition. Furthermore, in the case of a game in which players compete on the play time to beating the game, higher points may be given when the play time is shorter. Every time the game player GP plays a game in a range permitted through one ticket, the game server 4 transmits point information indicating the play result thereof to the management server 2.

FIG. 5 shows one example of a game table that stores a list of games executed by the game server 4. As shown in FIG. 5, in the game table, regarding each of the games executed by the game server 4, information to identify the game (game ID), the title name of the game, and genre information of the game are stored in association with each other.

FIG. 6 shows one example of a play result table that stores information on the play results of games recorded by the play result recorder 24. Every time receiving the point information indicating the result of a game play by the game player GP from the game server 4, the play result recorder 24 assigns a play result ID to identify the play. Then, the play result recorder 24 adds, to the play result table, a record in which information to identify the game player GP (player ID), information to identify the title of the game (game ID in FIG. 5), the play start date and time of the game, the play end date and time of the game, and won points indicating the play result of the game are associated with this play result ID. Furthermore, the play result recorder 24 may record a moving image showing how the game was played (play moving image). This play moving image may be a moving image representing the content of a game screen displayed on the display screen of the client device 3 used by the game player GP when the game player GP played the game for example.

The investment performance decider 25 decides the result of the investment made by the investor player IP (investment performance) every certain period (e.g. one week). In the present embodiment, every investment object period repeatedly set, the investment performance of each investor player IP is decided depending on the play performance of games played in the investment object period by the investment-target player selected as the investment target by the investor player IP. That is, when the play performance recorded as the result of plays of games by the investment-target player in the investment object period is higher, the investment performance of the investor player IP who has invested in this investment-target player becomes higher. Here, suppose that the investment object period is one week and suppose that, every week, the investment performance about the investment made in the previous week is decided depending on the play performance of the investment-target player in this week. That is, the investment object of the investment instruction accepted by the investment instruction accepter 22 is the predetermined investment object period starting after the acceptance timing of this investment instruction, and the investment performance is decided according to the play performance of the investment-target player in this investment object period.

Here, a specific example of the method for deciding the investment performance will be described. Every time the investment object period ends, the play result recorder 24 tallies points won by each game player GP in the investment object period that ends, and decides a ranking (rank order) thereof. In response to this, the investment performance decider 25 gives higher investment performance to the investor player IP who has invested in the game player GP at a higher ranking level. For example, the investment performance decider 25 gives a medal of kind according to the rank order of the investment-target player, specifically gives a gold medal to the investor player IP who has invested in the game player GP at the first place in the point ranking and gives a silver medal to the investor player IP who has invested in the game player GP at the second place.

Moreover, the investment performance decider 25 may use, for the decision of the investment performance, investment period information indicating how long the investor player IP has consecutively invested in the same investment-target player repeatedly. In this example, if an investment-target player achieves play performance not lower than predetermined performance in the investment object period, the investment performance decider 25 determines since when the investor player IP who has invested in this investment-target player has consecutively continued the investments. For example, suppose that the investor player IP invests in the same investment-target player for N weeks consecutively and this investment-target player achieves play performance not lower than certain performance in the investment object period of the N-th week. In this case, the investor player IP whose value of this N is larger is evaluated to get better investment performance compared with the other investor players IP. By applying such an evaluation criterion, the investor player IP is motivated to discover the game player GP who seems to achieve good performance in the future and continue investments in this game player GP from a stage where this game player GP has not yet attracted attention.

FIG. 7 shows one example of an investment performance table that stores the investment performance decided by the investment performance decider 25. In the example of this diagram, information to identify the investor player IP (player ID), investment performance (here, the kind of medal), and the timing when the investment performance is decided (information to identify the investment object period) are stored in the investment performance table in association with each other.

In the above-described example, the points of the play results of all games offered by the game server 4 are tallied and the investment performance is decided according to a ranking thereof. However, the method for deciding the investment performance is not limited to such a method. For example, the investment performance decider 25 may decide a ranking of the won points of the game players GP for each game genre and decide the investment performance of the investor players IP according to this ranking. In this case, a medal is given to the investor player IP who has invested in the game player GP who has achieved good performance in a certain genre although having low total points. Furthermore, the investment performance may be decided according to the numerical value of the total of the points won by the investment-target player. In this case, the investment performance of the investor player IP who has invested in plural investment-target players is decided depending on the total value of the points won by these investment-target players. Furthermore, if the performance of the game executed by the game server 4 is represented by not points but wins and losses, the investment performance may be decided according to the number of wins or the number of consecutive wins of the investment-target player.

In response to a request from each client device 3, the result displaying controller 26 transmits, to the requesting client device 3, information relating to the play performance of the game players GP and the investment performance of the investor players IP. The client device 3 displays the information received from the result displaying controller 26 on the display screen to present the information to the participant player P who uses this client device 3. This allows each participant player P to know who the game players GP who have achieved excellent game play performance and the investor players IP who have achieved excellent investment performance are. The investor player IP can consider which game player GP to select as the investment target by viewing ranking information of the game play performance of the game players GP. Furthermore, because the investment performance is disclosed, the participant player P who cannot get good performance in the game play by oneself can also enjoy, as the investor player IP, the pleasure of competition for the investment performance through investing in the game players GP who are good at the game play.

Specific examples of various kinds of screens displayed on the display screen of the client device 3 by the result displaying controller 26 will be described below by using the respective diagrams from FIG. 8 to FIG. 10.

FIG. 8 shows one example of a screen that displays ranking information of game play performance. Here, a ranking of won points in a certain investment object period is displayed from the first place sequentially. In the example of this diagram, the rank order of the total value of points recorded about all games is shown. However, the ranking is not limited thereto and a ranking made on each game genre basis and a ranking made on each game title basis may be offered to the participant players P. Furthermore, not a ranking of all of the participant players P but a ranking of part of the participant players P satisfying a specific condition may be displayed. Specifically, a ranking of the participant players P who started use of the present game system 1 in a recent predetermined period (newcomer ranking) and a ranking according to a profile of the participant players P (gender-specific ranking, age-specific ranking, etc.) may be displayed. Furthermore, a ranking may be displayed about each of the kinds of client devices 3 used by the participant players P. In addition, a ranking of a period different from the investment object period for decision of the investment performance (e.g. day-by-day ranking) may be displayed. Moreover, corresponding to the game player GP at a high ranking level, an advertisement of a company that sponsors this game player GP may be displayed.

FIG. 9 shows one example of a screen that displays investment performance. In the example of this diagram, together with a ranking of the game players GP, the investor players IP who have invested in the game players GP at high ranking levels are displayed in association with these game players GP. Furthermore, rewards given to each of the game players GP and the investor players IP are also displayed. In association with the investor player IP, investment period information indicating how long this investor player IP has continued investments in an investment-target player may be displayed.

When operation of selecting one of the game players GP displayed on the screen of FIG. 8 or FIG. 9 by a user is carried out, detailed information relating to the play performance of the selected game player GP may be displayed. FIG. 10 is a diagram showing one example of a screen that displays such detailed information relating to the play performance of the certain game player GP. In the example of this diagram, a graph showing the time transition of won points and various kinds of information relating to the play performance are displayed. For example, the frequency of login to the present game system 1, the account creation date, the last login date, the genre ratio of played games, the genre ratio of won points, rewards won thus far through winning of a high ranking level, and so forth are displayed. Furthermore, information relating to received investments may be displayed, such as the number of times of investment reception thus far and the length of the period for which the state in which the investment is received from any investor player IP has continued (information on the investment-received period).

Figure 10:
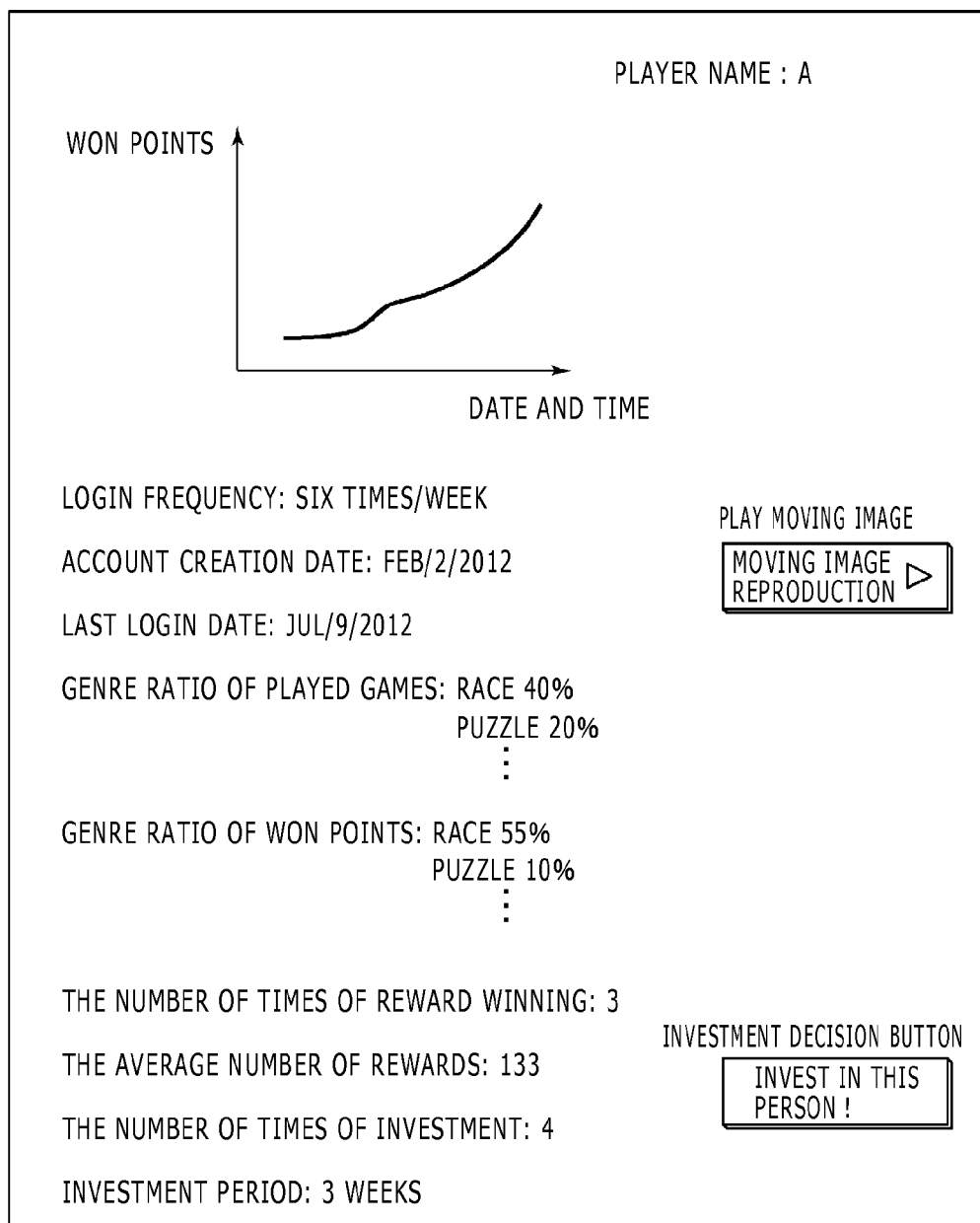
FIG. 10 is a diagram showing one example of a screen that displays detailed information relating to the play performance of a certain game player.

Moreover, in the example of FIG. 10, a link to play moving images of games played by the object game player GP in the past is disposed in the screen. When selecting this link, the user can view the play moving images of this game player GP. This allows the investor player IP to determine whether or not to invest by actually viewing play moving images of the game player GP. Furthermore, in the example of FIG. 10, an investment decision button is included. When selecting this button, the user can immediately invest in this game player GP as the investment target.

After deciding the investment performance every investment object period, the investment performance decider 25 may provide rewards to the respective investor player IP according to the result of the investment performance. For example, the investment performance decider 25 may give the game play right R (ticket), other rights, money in the game system, etc. to the investor player IP who has achieved excellent investment performance. Furthermore, the play result recorder 24 may give a reward such as the game play right R (ticket), other rights, and money in the game system to the game player GP who has achieved excellent game play performance according to the recorded play result. As a specific example, every time the investment performance decider 25 decides the investment performance at the elapse of the investment object period, the game player GP at a high level in the play performance of the same investment object period may be given tickets the number of which corresponds to the rank order. Furthermore, the reward to the game player GP may be decided depending on whether or not the game player GP has received an investment. Specifically, a larger reward may be given to the game player GP who has received an investment and achieved good performance than to the game player GP who has achieved equivalent performance without receiving an investment.

The game system 1 according to the present embodiment may offer statistical information and so forth helpful in an investment determination to the investor players IP and the participant players P who provide information to the other investor players IP. Specifically, the game system 1 may offer, for value, information that is helpful in deciding an investment destination and is not opened to the public normally, such as information relating to the amount of charge of each participant player P and information relating to match performance with the specific opposition, which is not represented in mere game play performance.

Embodiments of the present invention are not limited to the above-described one. For example, in the above description, the investor player IP simply specifies only the game player GP to make an investment instruction and the investment performance is decided according to all game play results of this game player GP in the investment object period. However, the configuration is not limited thereto and the investor player IP may invest by specifying conditions such as the game title or game genre of the investment object besides the game player GP. In this case, the investment performance is so decided that only the play result of a game meeting the specified conditions is deemed as the object.

Furthermore, in the above description, the investor player IP can select the investment-target player without limit. However, limits may be set on the number of investor players IP who can concurrently invest in one game player GP and the total value of the amount of investment when one game player GP is concurrently selected as the investment target. In this case, for example if a certain number of investor players IP invest in the same investment-target player on a first-come-first-served basis, the other investor players IP become unable to invest in this investment-target player more. This can motivate the investor players IP to discover the game player GP before becoming popular and invest in this game player GP ahead of the others.

Furthermore, in the above description, the game server 4 executes game processing. However, the management server 2 may execute also the game processing itself. Moreover, the client device 3 used by the game player GP may execute the game processing and the game management server 2 may acquire the game play result from the client device 3 and decide investment performance. If the game processing is executed in the client device 3, the client device 3 does not necessarily need to be connected to a network and may execute the game processing offline while the game player GP is playing the game. In this case, the client device connects to the network after the end of the game play or every certain time to transmit the game play result to the management server 2. Furthermore, the management server 2 may make an inquiry to only the client devices 3 used by the game players GP who have become the investment target and acquire the play results thereof. This allows the management server 2 to decide investment performance without acquiring game play results by all of the client devices 3.

The invention claimed is:

1. An information processing device comprising:
   an instruction accepter that accepts an instruction to specify any of a plurality of game players as a recipient-target player from an transferor player;
   a play result recorder that records a play result of a game by the recipient-target player;
   a performance decider that evaluates a performance of the transferor player according to the play result of the game recorded about the recipient-target player specified by the transferor player; and
   a play right giver that transfers digital rights as a game play right to the recipient-target player according to the instruction.

2. The information processing device according to claim 1, wherein the play right giver transfers the game play right in the possession of the transferor player to the recipient-target player according to the instruction.

3. The information processing device according to claim 1, wherein the play result recorder records play results of a plurality of kinds of games played by the recipient-target player, and the performance decider evaluates the performance of the transferor player according to the play results of the plurality of kinds of games.

4. The information processing device according to claim 3, wherein
   the instruction accepter accepts the instruction together with specifying of a title of a game or a genre of a game, and
   the performance decider evaluates the performance of the transferor player according to a play result recorded through play of a game of the specified title or genre by the recipient-target player.

5. The information processing device according to claim 1, wherein every object period that is repeatedly set, the performance decider evaluates the performance of the transferor player according to a play result recorded in the object period.

6. The information processing device according to claim 5, wherein the performance decider evaluates the performance of the transferor player according to timing period information indicating how long the transferor player has consecutively instructed the transfer the of the digital rights as a game play right to the recipient-target player repeatedly.

7. A control method of an information processing device, comprising:
   accepting an instruction to specify any of a plurality of game players as an recipient-target player from an transferor player;
   recording a play result of a game by the recipient-target player;
   evaluating performance of the transferor player according to the play result of the game recorded about the recipient-target player specified by the transferor player; and
   transferring digital rights as a game play right to the recipient-target player according to the instruction.

8. An apparatus comprising a non-transitory, computer readable storage medium containing a program and a microprocessor executing the program for causing the computer to execute actions, comprising:
   accepting an instruction to specify any of a plurality of game players as an recipient-target player from an transferor player;
   recording a play result of a game by the recipient-target player;
   evaluating performance of the transferor player according to the play result of the game recorded about the recipient-target player specified by the transferor player; and
   transferring digital rights as a game play right to the recipient-target player according to the instruction.

9. A non-transitory computer-readable information storage medium that stores a program for causing a computer to carry out actions, comprising:
   accepting an instruction to specify any of a plurality of game players as an recipient-target player from an transferor player;
   recording a play result of a game by the recipient-target player;
   evaluating performance of the investor transferor player according to the play result of the game recorded about the recipient-target player specified by the transferor player; and transferring digital rights as a game play right to the recipient-target player according to the instruction.

\* \* \* \* \*